(12) United States Patent  
Yap (10) Patent No.: US 7,053,814 B2  
(45) Date of Patent: May 30, 2006

(54) RF LIGHTWAVE CODING SYSTEM FOR RADAR PULSE COMPRESSION

(75) Inventor: Daniel Yap, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 198 days.

(21) Appl. No.: 10/760,021

(22) Filed: Jan. 15, 2004

(65) Prior Publication Data

US 2005/0156778 A1 Jul. 21, 2005

(51) Int. Cl.  
*G01S 13/86* (2006.01)

(52) U.S. Cl. ............... 342/54; 342/195; 342/132; 342/134; 342/135; 342/137

(58) Field of Classification Search ........... 342/54, 342/127–137, 139, 140, 145, 146, 195  
See application file for complete search history.

(56) References Cited

U.S. PATENT DOCUMENTS

| | | | | |
|---|---|---|---|---|
| 4,071,907 A | * | 1/1978 | Casasent | 708/816 |
| 4,216,474 A | * | 8/1980 | Levine | 342/201 |
| 4,258,363 A | * | 3/1981 | Bodmer et al. | 342/157 |
| 4,588,255 A | * | 5/1986 | Tur et al. | 385/24 |
| 4,642,582 A | * | 2/1987 | O'Meara | 359/244 |
| 4,814,773 A | * | 3/1989 | Wechsberg et al. | 342/368 |
| 5,353,033 A | * | 10/1994 | Newberg et al. | 342/375 |
| 5,365,239 A | * | 11/1994 | Stilwell, Jr. | 342/368 |

OTHER PUBLICATIONS

"Superconductive tapped delay lines for microwave analog signal processing", Withers, R.; Anderson, A.; Wright, P.; Reible, S.; Magnetics, IEEE Transactions on vol. 19,Issue 3,May 1983 Ps:480-484.*

"High temperature superconductive wideband compressive receivers", Lyons, W.G.; et al; Microwave Theory and Techniques, IEEE Transactions on vol. 44, Issue 7, Jul. 1996 Ps:1258-1278.*

"Subband-domain signal processing for radar array systems", Rabinkin-D-V; Pulsone-N-B. Advanced Signal Processing Algorithms, Architectures, and Implementations IX, Jul. 1999 p. 174-87.*

(Continued)

*Primary Examiner*—John B. Sotomayor  
(74) *Attorney, Agent, or Firm*—Ladas & Parry LLP (57) ABSTRACT

An apparatus for preparing a RF radar transmit waveform and for decoding RF return waveforms comprising: a RF-lightwave encoder and a decoding preprocessor to phase-encode the RF radar transmit waveform and partially decode the return signal, the encoder including switched optical delay lines for producing desired RF phase shifts, and the decoding preprocessor including a tapped optical delay line and optical delay lines that counteract the delays imposed by the delay lines of the encoder, wherein the RF-lightwave encoder and the decoders allow shorter compressed pulses and larger pulse-compression ratios to be achieved than can be obtained using conventional electronic approaches. Wideband transmit waveforms can be generated due to the use of the switched optical delay lines and, unlike prior art approaches, is not restricted to single-frequency waveforms. The taps can be weighted to accomplish objectives such as reduction of side lobes in the compressed pulse.

35 Claims, 7 Drawing Sheets

U.S. PATENT DOCUMENTS 5,519,526 A * 5/1996 Chua et al. .............. 398/139
2005/0156778 A1 * 7/2005 Yap ............................ 342/54

OTHER PUBLICATIONS

Doi, F., et al., "Phase Shift Keying Using Optical Delay Modulation for Millimeter-Wave Fiber-Optic Radio Links," *Journal of Lightwave Technology*, vol. 18, No. 3, pp. 301-307 (Mar. 2000).

Fukushima, S., et al., "New Phase-Shift Keying Technique Based on Optical Delay Switching for Microwave Optical Link," *IEEE Photonics Technology Letters*, vol. 11, No. 8, pp. 1036-1038 (Aug. 1999).

Nathanson, F., et al., "Phase Coding Techniques," *Radar Design Principles*, Second Edition, SciTech Publishing, Inc., Mendham, New Jersey, pp. 533-582 (1999).

* cited by examiner

Fig 5d clk data,
after pulse expansion phase decoded and
summed output output after "anding"
with clk envelope

RF LIGHTWAVE CODING SYSTEM FOR RADAR PULSE COMPRESSION

STATEMENT OF GOVERNMENT INTEREST

This invention was related to work performed under the government contract No. F33615-02-C-1184". T*he* government has certain rights in this *invention*.

TECHNICAL FIELD

The technical field of the disclosed technology relates to a RF-lightwave system for temporal compression of RF pulsed waveforms. This allows a radar system to have a longer detection range and also improved range resolution.

BACKGROUND INFORMATION

Most radar systems, especially those that have lower probability of interception (LPI), operate at limited average transmit powers. LPI systems also may involve wideband transmit waveforms (spread spectrum) instead of single-frequency waveforms. In order to increase the detection range of these radar systems, transmit pulses of longer duration, or even continuous (cw) waveforms, are often used. However, the range resolution is reduced as the pulse is lengthened. Pulse compression techniques are available that sub-divide the pulse into a number of shorter intervals in which the waveform frequency or phase is coded in a way that makes those intervals distinct. The radar return waveform is processed in such a way that the various intervals are overlaid in time to create a much shorter effective pulse of higher energy. For example, many radar systems employ transmit pulses that have a duration of 10 to 500 microseconds. In comparison, the pulse needs to be compressed to approximately 2 nanoseconds to achieve a range resolution of 1 foot. Pulse compression ratio is defined as the ratio of the transmit pulse duration and the sub-divided pulse interval. Thus, there is a desire to achieve large pulse compression ratios since that improves the processing gain of the radar system.

Phase coding is one way to achieve large pulse-compression ratios and is used in many radar systems. Presently, phase coding has only been used for narrow-band radar systems, partly because of the difficulty of generating and processing wideband waveforms by electronic means.

The RF-lightwave approach disclosed herein is compatible with wideband uncompressed waveforms that may be useful for LPI systems. In fact, this approach can be used with a variety of waveforms. The disclosed approach also can potentially achieve shorter sub-divided pulse intervals, which could lead to larger pulse compression ratios and finer range resolutions or improved processing gain. Because the short sub-divided pulse interval can be achieved, the approach disclosed herein also can be used to compress, by phase coding, individual pulses in the pulse bursts that often are employed in radar systems. Bursts of short pulses have high pulse-repetition frequencies, with each burst separated by longer intervals. This can reduce the range and Doppler ambiguities.

The disclosed approach preferably combines the benefits of large pulse-compression ratios, short compressed pulses and compatibility with a variety of wideband waveforms.

Improved range resolution allows the radar system to not only detect the presence of objects but also to identify them by detecting their features. The disclosed approach makes possible the achievement of pulse compression with wideband LPI waveforms.

The prior art includes electronic methods for pulse compression by phase coding, and a large number of pulse compression phase codes are known as are the radar systems that employ phase-coded pulse compression. The presently disclosed technology makes use of conventional phase codes and likely can also make use of future phase coding techniques as well. Examples of conventional phase codes are discussed in a book chapter on Phase-Coding Techniques by Cohen and Nathanson in Radar Design Principles, 2nd Ed., SciTech, 1999.

Prior art approaches for using phase encoding in radar systems typically involve direct changes of the phase at the microwave carrier frequency. Microwave "magic-tee" transmission line structures provide anti-phase outputs and "hybrids" provide 0 and 90° phase shifts over bandwidths in excess of 20 percent of the carrier frequency. Semiconductor diode switches, which can have switching speeds of a few nanoseconds, are typically used to select the phase. Thus, the sub-divided pulse intervals are at least many nanoseconds in duration. Digital approaches also can be used to generate phase-shifted waveforms. Digital synthesizers, however, are generally limited to frequencies of several hundred megahertz or lower.

The processing of radar return signals is typically done using analog microwave tapped delay lines or by using digital shift registers. The tapped delay lines can operate at the microwave carrier frequency or at a lower, intermediate frequency. Some prior tapped delay lines operate after the return signal has been down-converted to video frequencies. Typically, lengths of microwave cable or transmission lines are used as the delay lines. The tapped delay-line function also can be accomplished by surface acoustic wave (SAW) devices. For each tapped signal, an appropriate phase shift, using the approaches described in the preceding paragraph, is applied to counteract the phase shift produced at the encoder. The outputs from the various re-shifted taps are then summed together. For high-frequency signals, the microwave implementations of the tapped delay line approaches can limit the cumulative delay (the delay increment times number of taps) because of the attenuation of the delay lines. Also, the phase re-shifts generally cannot be changed quickly. Digital techniques typically involve sampling and quantizing the return signal and then moving that sampled data down a shift register. The sampler and shift register can be clocked at the sub-divided interval. The phases of the data samples in the register are then compared with a template pattern to determine a match. Since only the phase or sign of the data samples are compared, the quantizer can be quite coarse in terms of resolution. The fastest digital samplers are capable of clock rates of several gigahertz.

The presently disclosed technology also preferably makes use of tapped delay line paths, similar to some of the decoding architectures. A new way to accomplish delays for time-delay encoding/decoding, by using switched optical delay lines, is disclosed. A key advantage of the photonic approach for encoding described herein is that the subdivided pulse interval can be fractions of a nanosecond long. This leads to improved range resolution. Likewise, the counteracting time-delay shifts (the time-delay re-shifts) applied to the tapped signals in the decoder can be changed quickly—at speeds in excess of several gigahertz. This can allow the decoder to be reconfigured or adapted rapidly to account for effects such as Doppler shifts from closely spaced targets.

Switched optical delay lines have been used for RF antenna beam forming. Tapped optical delay lines have been used for constructing RF filters as well as for beam forming. It is not believed that there exists any prior use of switched or tapped optical delay lines to construct RF time-delay encoders or decoders for pulse compression.

Switched optical delay lines have been used in the past for phase-shift keying of signals for communications applications. These phase modulators are described by Fukushima, Doi, et al., in articles published in *J. Lightwave Technology*, v. 18, p. 301 (2000) and in *IEEE Photonics Technol. Letters*, v. 11, p. 1036 (1999). The architecture of these prior phase modulators is somewhat similar to the architecture of the time-delay encoders disclosed herein. For these prior phase modulators, however, a single-frequency microwave signal is impressed on the lightwave carrier. In contrast, the time-delay encoder disclosed herein may be used with both single-frequency and wideband RF waveforms.

BRIEF DESCRIPTION OF THE PRESENTLY DISCLOSED TECHNOLOGY

The RF radar transmit and return waveforms are modulated onto lightwave carriers. A RF-photonic encoder and a decoding preprocessor are used to phase-encode the Transmit waveform and partially decode the return signal. The encoder contains switched optical delay-lines to produce the desired RF phase shifts. The decoding preprocessor is based on a tapped optical delay line. The taps can be weighted to accomplish objectives such as reduction of side lobes in the compressed pulse. By using RF-lightwave encoders and decoders, one can achieve shorter compressed pulses and larger pulse-compression ratios than can be obtained using conventional electronic approaches. The presently disclosed technology is applicable to wideband transmit waveforms since it uses switched optical delay lines and, unlike prior approaches, is not restricted to single-frequency waveforms.

BRIEF DESCRIPTION OF THE DRAWINGS

FIGS. 1a and 1b are block diagrams of a RF lightwave time-delay coding system, FIG. 1a depicting a phaser encoder while FIG. 1b depicts a phase decoder;

DETAILED DESCRIPTION

Figure 1A:
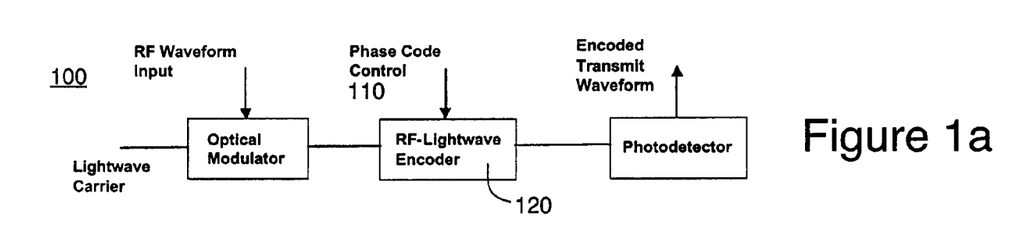
Figure 1B:
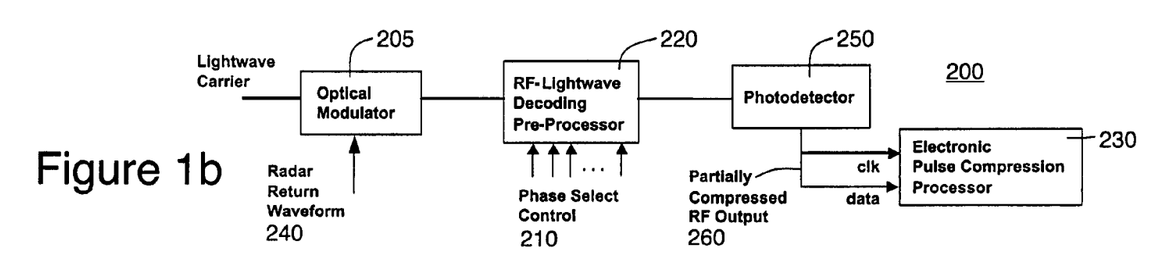

The RF lightwave time-delay coding system disclosed herein includes a RF-lightwave phase encoder 100 and a phase decoder 200. The phase decoder 200 contains a RF-lightwave time-delay decoding preprocessor 220. Both the encoder 100 and the decoder 200 can have RF inputs and outputs. One or more of their inputs and/or outputs can alternatively be a RF-lightwave port instead of a RF port. For a RF-lightwave port, the signal is in the form of a RF-modulated lightwave carrier. A block diagram of an embodiment of the RF-lightwave phase encoder is depicted by FIG. 1a while the phase decoder is depicted by FIG. 1b. For RF inputs and outputs, the system also includes optical modulators and photodetectors that transduce the signal from the RF domain into the RF-lightwave domain.

A phase-code control signal data stream or sequence is supplied via a control input 110 to the RF lightwave encoder 120. The control signal 218 on this control input 110 can be a binary data stream if the phase code is a binary code. The binary data stream could be the phase code itself, amplified to the voltage needed to control the encoder. However, the data stream is normally established by a phase-encoding processor. The phase code can be changed from pulse to pulse. The phase-select control lines 210 for the decoding preprocessor 220 set the phase shifts that are applied to the return signal 240. The sequence of phase shifts that are determined by this set of control lines 210 normally would be an inverse of the phase code. This sequence can be changed to accommodate different phase codes. The photodetector 250 after the decoding preprocessor 220 has a single RF output 260 that is a series of short RF sub-pulses. These sub-pulses are supplied to the electronic pulse-compression processor 230 and are used for two different purposes. They indicate the time intervals (clk) during which a code match should be considered by the processor 230. They also contain the partially decoded phase information (data). The phase of the RF waveform in each sub-pulse is still partially encoded. Examples of the operation and preferred embodiments of the RF-lightwave encoder 120 and decoding preprocessor 220 are described below.

Figure 2:
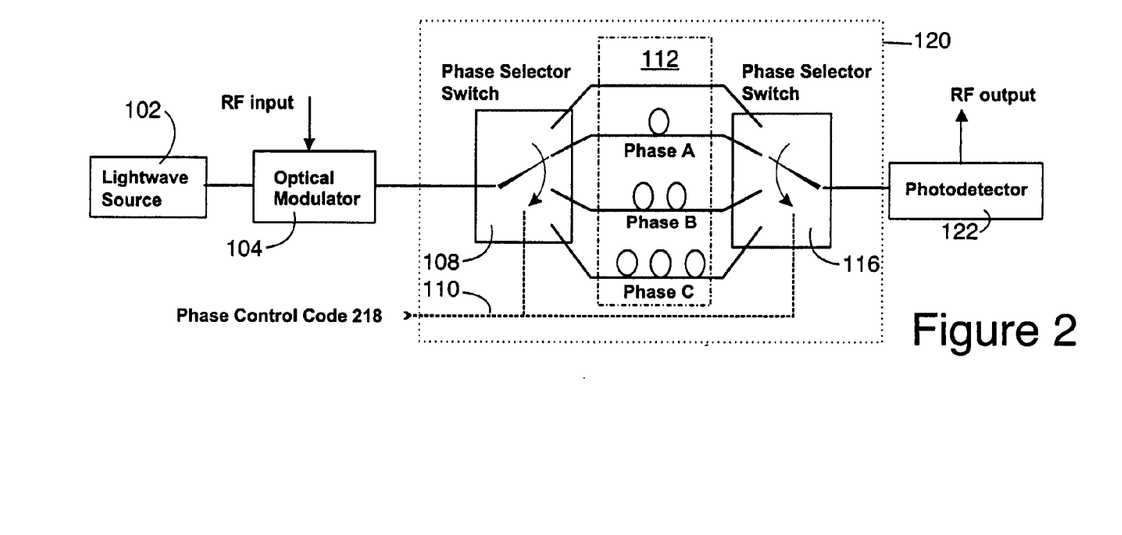
FIG. 2 illustrates the basic elements and operation of the RF-lightwave encoder.

The basic elements and operation of the phase encoder 100 are illustrated with reference to FIG. 2. The lightwave source 102; optical modulator 104 and photodetector 122 are optional components of the encoder 100, depending on whether the desired inputs and outputs of the encoder are signals in the RF domain or the RF-lightwave domain. The basic elements of the encoder are one or more sets of phase-selector switch structures 108, 116 and at least two optical delay paths 112. The phase-selector switches 108, 116 determine which of the optical delay paths 112 is selected for the signal to undergo. One of the optical delay paths is a reference path. The other paths are longer than the reference path by specific increments that produce successively greater RF phase shifts by having the signal propagate for successively longer durations of time in those paths. The length increments are determined by the approximate frequency of the RF signal and the desired amounts of phase shift. These phase shifts represent different fractions of the approximate period of the RF waveform. For example, a 180° phase shift at 4 GHz requires a time delay of 125 psec. Such a delay can be realized with silica waveguides having lengths of 25 mm. Given the relatively short waveguide lengths needed, the encoder 100 can be implemented with reasonable loss using integrated-optics technologies such as III–V semiconductors or lithium niobate that are capable of rapid switching.

The phase selector switches 108, 116 can be implemented in several ways. In one way, the input signal is divided into all of the delay paths. The delayed signal from only one of those paths is coupled to the output. This approach was used in the prior-art modulators for phase-shift keying (described in the aforementioned articles by Fukushima, Doi, et al.). The on/off path switching can be accomplished by means of optical intensity modulators such as Mach-Zehnder modulators or electro-absorption modulators, both of which are known in the art. Mach-Zehnder modulators have been constructed from III–V semiconductor or lithium niobate materials. Electro-absorption modulators have been constructed from III–V semiconductor materials. Another implementation makes use of optical-path routing switches such as directional couplers. Such switches typically have one or two inputs and one or two outputs. They direct the light from an input into one of the outputs, according to the level of an electrical control signal. Directional coupler switches are known and have been constructed from III–V semiconductor or lithium niobate materials.

Figures 3, 3A:
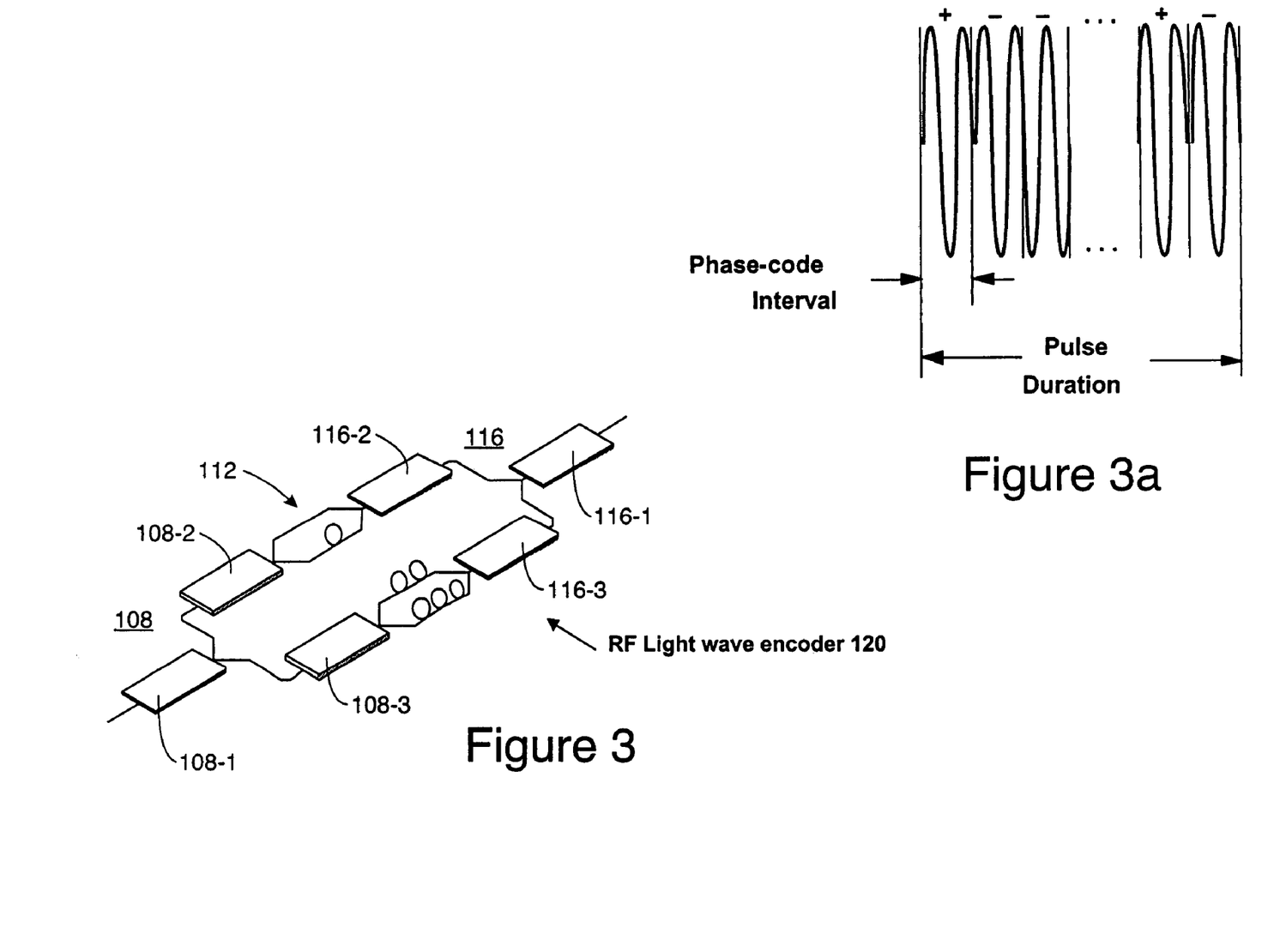
FIG. 3 illustrates an example of an encoder containing directional coupler switches.
FIG. 3a depicts the shifting of the phase of a single frequency waveform by steps of ±180°.

An example of an encoder containing directional coupler switches is illustrated in FIG. 3. An encoder 120 that is capable of producing four different phase states is shown. The switch structure 108 at the input is constructed from three 1×2 directional couplers or switches 108-1, 108-2 and 108-3. The switch structure 116 at the output likewise is constructed from three 2×1 directional couplers 116-1, 116-2 and 116-3. The states of these directional couplers 108, 116 are set so that light is routed through the desired delay waveguide 112. The state of a directional coupler can be changed very rapidly, at rates in excess of 10 GHz. These couplers or switches 108, 116 are reconfigured at each phase-code interval. It should be noted that any net phase shift between 0° and 360° could be selected by switching of the delay paths. Also, if an input waveform consists of several frequency components, those frequency components need not undergo the same phase shift, although those phase shifts will be produced by the same delay. For example, a signal component at 8 GHz may receive a phase shift of 90° while a component at 7 GHz receives a phase shift of 77°. Since the switching can be done so rapidly, the phase-code intervals can be very short. For example, a 10 GHz switching speed corresponds to a phase-code interval of only 100 psec. This means that very short compressed pulses can be achieved. Obviously, the duration of the compressed pulse should be appropriately greater than the period of the wave associated with the approximate frequency of the RF waveform.

Phase-code control signals 218 are used to set the states of the switches 108, 116. These signals can have data that change at a rate as high as the phase coding rate. For a binary phase code, only two optical paths are needed. One pair of directional-coupler switches can provide the phase selection when there are only two possible optical paths. A control signal equivalent to an amplified version of the zero/one phase-code sequence is used to control the states of the switches. A "zero" switches the light through the reference delay path and a "one" switches the light through the phase A delay path. The phase A delay path, in this case, is set to produce some desired phase, typically near 180°, in the RF waveform. A digital processor can be used to generate the desired code sequence. The electrical waveform of the code sequence can then be frequency upconverted, if necessary, to the desired phase coding rate before being applied to the encoder.

The desired phase-coded waveform is obtained by selecting different RF phase shifts for each phase-code interval according to a specified phase code sequence ($218_1$, $218_2$, . . . $218_{n-1}$, $218_n$) supplied to control input 110. Different numbers of possible delay paths and different delay-path lengths can be chosen to accommodate different phase shift formats (e.g., binary or quadrature phase codes) and/or different approximate frequency ranges of the RF waveform (e.g., 2, 8, 16, 35 GHz). This shifting of the phase is illustrated in FIG. 3a, for a single-frequency RF signal (using only the reference path and another delay path). Additional delay paths could enable the same encoder to be used for other RF-waveform frequency ranges.

Figure 4A:
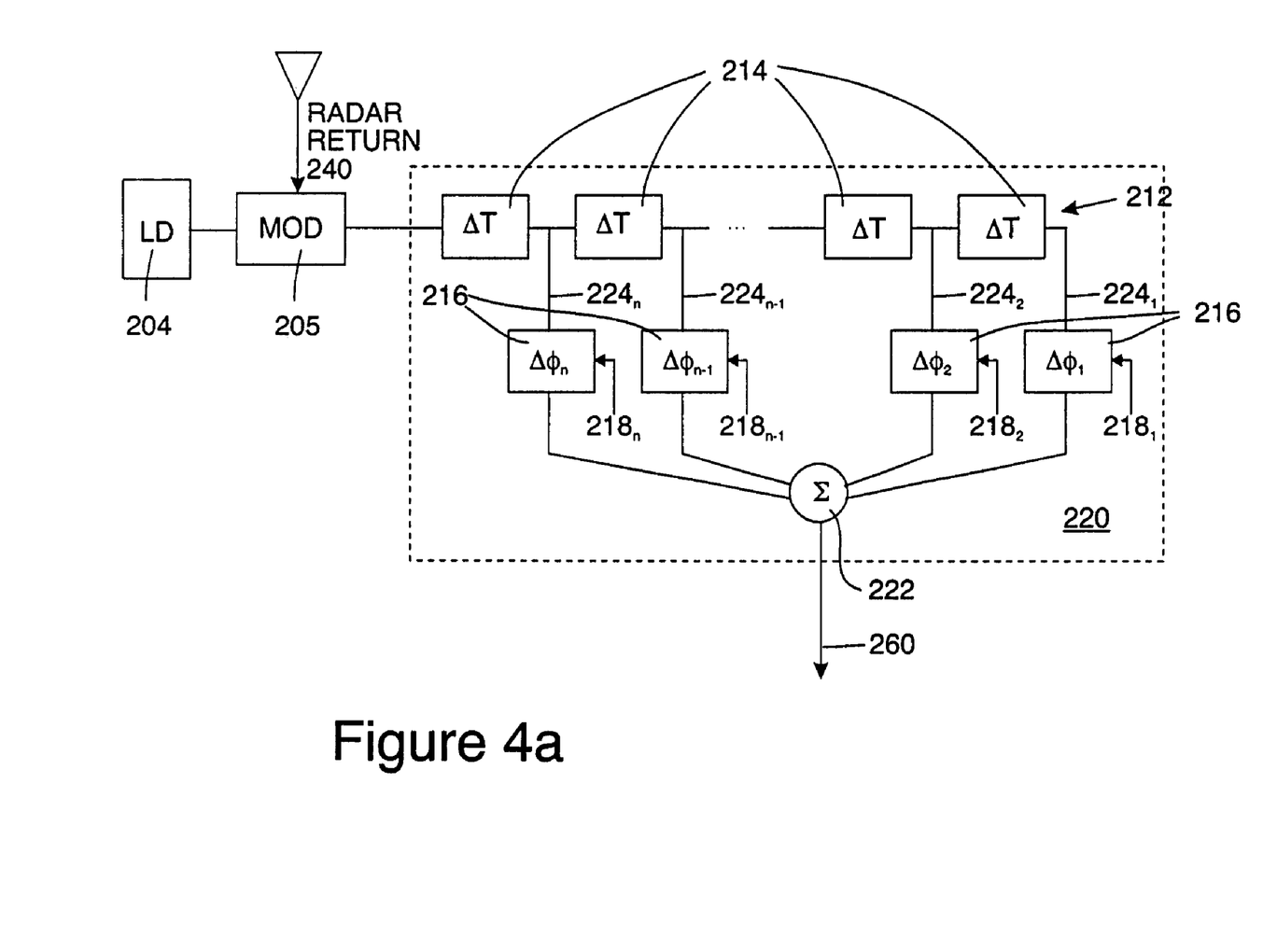
FIG. 4a illustrates the operation of a tapped delay line as the decoding preprocessor.

The decoding preprocessor 210 is based on a tapped delay line 212, an embodiment of which is illustrated by FIG. 4a. Each time delay interval ΔT of the delay line 212 is equal to the phase-code interval for the radar pulse. The RF radar return signal 240 is first modulated by a modulator 205 onto a lightwave carrier generated by a laser diode 204. The RF-lightwave signal is then fed to the tapped optical delay line 212. Optical-waveguide taps are located after each time delay segment 214 and each diverts a portion of the signal to a set of phase selectors 216, the diverted portions being appropriately delayed copies of the RF lightwave radar return signal. The first tap $224_n$ is associated with the last digit of the code $218_n$, the second tap $224_{n-1}$ with the second to last digit of the code $218_{n-1}$, and so on. The phase selector is preferably similar to the phase encoder discussed above and illustrated in FIGS. 2 and 3. For example, in the phase encoder phase A is a short delay (e.g. 0.1 nsec), phase B is a longer delay (e.g. 0.2 nsec) and phase C is a longer still delay (e.g. 0.3 nsec). However, for the phase selector, phase A corresponds to the longest delay (e.g. 0.3 nsec). Phase B is of medium delay (e.g. 0.2 nsec) and phase C is of shorter delay (e.g. 0.1 nsec). Thus, when used in the decoding preprocessor 220, each return phase selector 216 counteracts the time delay applied to that particular phase-code interval by the transmit phase encoder 112. The result of this decoding is that all phase-code intervals undergo the same total time delay when a combination of the transmitter and receiver imposed time delays is considered.

The duration ΔT of the desired time delay and the length of the delay line 214 between taps 224 is determined by the desired compressed-pulse width. For example, a 0.5 nsec compressed-pulse width translates to a waveguide length of 10 cm in silica and 6.8 cm in lithium niobate. This inter-tap delay length limits the number of taps and delay segments that can be integrated on a single substrate. A maximum of 6–13 delay segments may be reasonable, given typical waveguide losses of <0.1 dB/cm for silica and <0.2 dB/cm for lithium niobate.

Figure 4B:
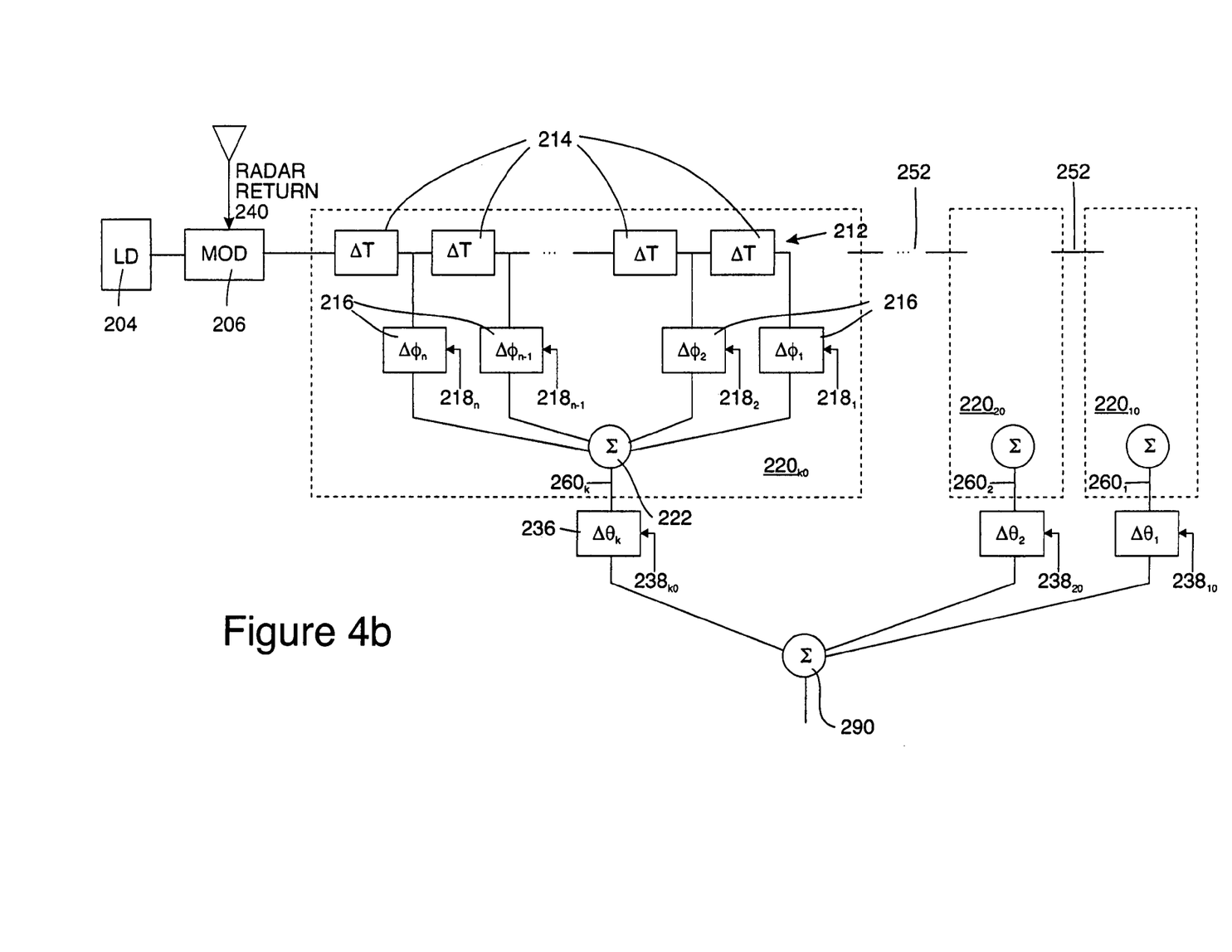
FIG. 4b illustrates the decoding of a two-layer concatenated Barker code when the electronic processor uses a tapped-delay line.
Figure 4C:
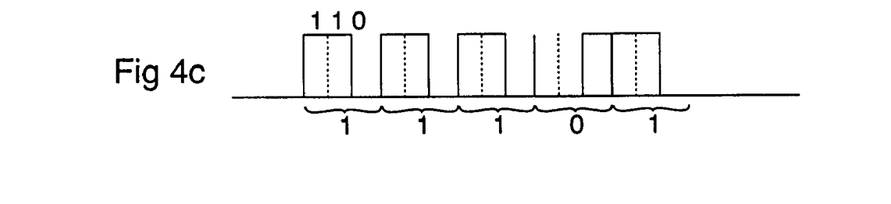
FIG. 4c illustrates a two-layer concatenation comprising a length 3 basic Baker code that is concatenated according to a length 5 Baker sequence to form a length 15 code.

The selection of an appropriate phase code for a given radar application depends on the characteristics of the target to be detected and/or identified. These characteristics include the target's radial velocity (Doppler shift) and the presence of multiple targets or of clutter. For slowly moving targets, binary phase codes such as Barker code (or sequences) are sometimes preferred because they result in compressed pulses that have low temporal side lobes. Although the longest known Barker code has a length of thirteen, phase codes having lengths up to 10,985 have been derived by concatenating or overlaying multiple Barker codes (or other codes), as discussed in the book chapter by Cohen and Nathanson. For example, each higher layer of a combined-Barker code is essentially a Barker coded super-interval of Barker coded intervals. FIG. 4c illustrates a two-layer concatenation comprising a length 3 basic Baker code (the first layer) that is concatenated according to a length 5 Baker sequence (the second layer) to form a length 15 code. This multilayer overlay or concatenation approach is especially suitable for RF-lightwave decoder 200. The decoding preprocessor 220 may be used to compress the basic Barker-coded interval (i.e., the first layer of the code).

The partially compressed output of that preprocessor 220 can then be further compressed by an electronic pulse-compression processor 230 (see FIG. 1). The data is supplied to the electronic processor 230 at a slower rate than the pulse-code rate. Thus, the electronic processor 230 has sufficient speed to perform the additional phase decoding, using the higher layers of the code. For example, assume that the compressed pulse interval has a one nanosecond duration and that the first-layer code has a length of seven. The data is then supplied to the electronic processor 230 at a rate of 143 MHz, which is compatible with many processors 230 having high dynamic range. By way of an example, see FIG. 4b, which illustrates the decoding of a two-layer concatenated Barker code when the electronic processor 230 likewise uses a tapped-delay line format. The function of the combined RF-lightwave preprocessor 220 and the electronic processor 230 can be illustrated as a nested arrangement of the tapped delay lines. It should be noted that FIG. 4b provides a functional representation rather than a physical representation of the decoder 220. Functionally, the electronic summing node 222 of the RF-lightwave preprocessor 220 produces an output pulse $260_1$ at the occurrence of each code match in a basic (first layer) Barker-coded interval. The sequence of output pulses ($260_1$, $260_2$, . . . $260_k$), one for each basic Barker-coded interval, can be illustrated functionally as being produced by a cascade of tapped-delay line preprocessors (e.g. $220_{10}$, $220_{20}$, . . . , $220_{k0}$). Note that those output pulses are actually preferably produced, at different times, by the same physical preprocessor 220 as opposed to by separate processors as functionally depicted by FIG. 4b. Each output pulse 260' shown in FIG. 4b is given, by a phase selector 236, an additional, compensating phase shift $\Delta\theta_1$, . . . , $\Delta\theta_k$ that is associated with the Barker code of that super-interval (i.e., the second code layer). The time delays applied by those phase selectors are controlled by phase-select control signals 238. The output of phase selectors 236 are then summed together at a summing point 290. A strong pulse results when the phases of those outputs are matched with each other.

The output of summing node 222 is detected by a photodetector and produces the partially compressed RF output 260. A "clk" signal and a "data" signal are derived from output 260. This output 260 is described in more detail below.

Figures 5A, 5B:
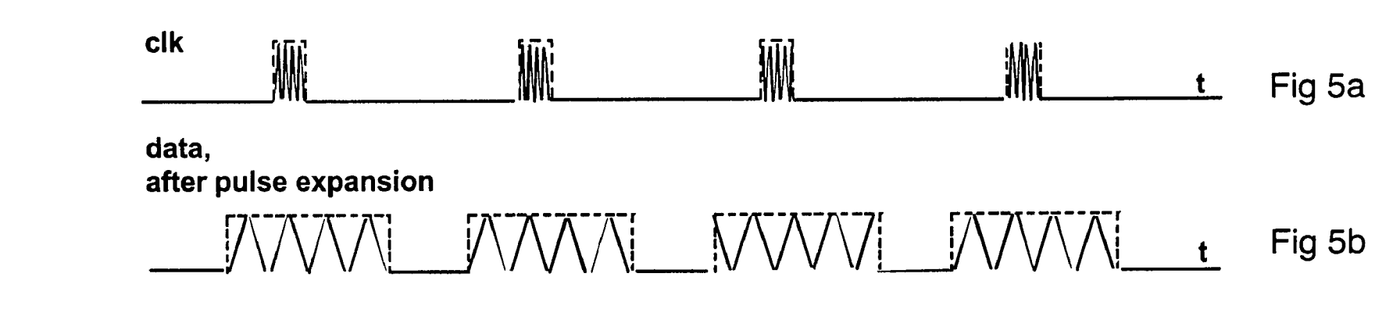
FIGS. 5a–5d illustrate some of the signals occurring in electronic pulse-compression processor.
Figure 5C:
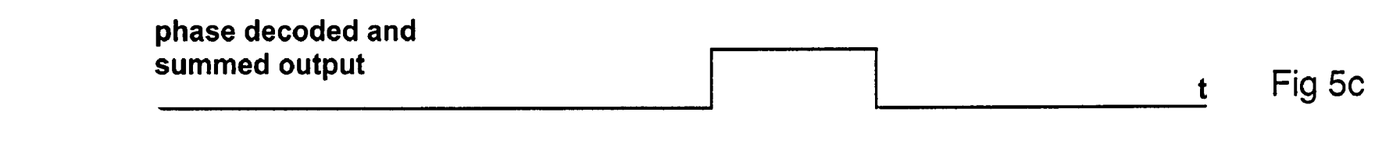
Figure 5D:
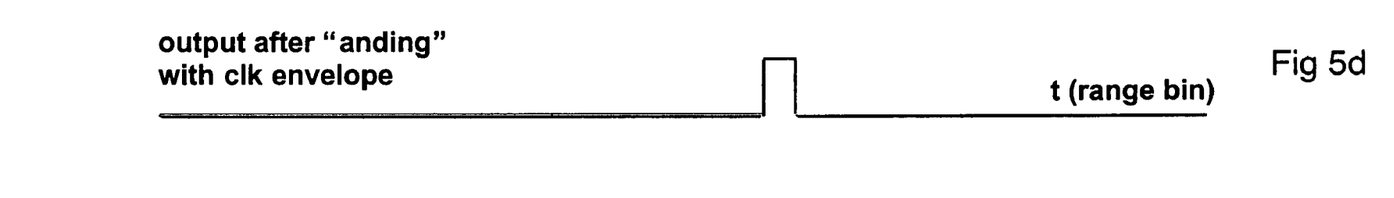

To further describe the decoder 200, some of the signals of the electronic pulse-compression processor 230, are illustrated in FIGS. 5a–5d. The "clk" signal (see FIG. 5a) is the series of partially compressed pulses supplied by the decoding preprocessor 220. These pulses have the desired compressed-pulse width. There are a number of such "clk" pulses within the duration of the radar return from a single target scatterer. Essentially, one "clk" pulse occurs within each basic Barker-coded interval. The second processor, the electronic processor 230, essentially determines which of these "clk" pulses corresponds to the actual range of the target. The "clk" signals also are expanded in duration (see FIG. 5b), typically accompanied by a low pass or temporally integrating filter, to form the "data" inputs for the electronic processor 230. This expansion allows the "data" to be handled more easily by the lower-bandwidth processor. The electronic processor 230 decodes by overlaying the "data" into the appropriate temporal interval, perhaps by using electronic tapped delay lines 252 and compensating for the phase shifts produced by using phase selectors 236, and summing them at a summing node 290 as shown by FIG. 4b. The result of this operation is illustrated by FIG. 5c. The desired output of the phase decoding processor 200 is the logical "and" of the electronically decoded signal with the "clk" pulse duration (i.e., when the "clk" envelope coincides with an envelope of the decoded "data"), as illustrated by FIG. 5d.

Other types of codes also could be used. For example, some polyphase codes can approximate linear frequency modulation of the transmit waveform. Such codes may have improved performance when the target is moving. The disclosed encoder and the disclosed phase selector in the decoding preprocessor are compatible with polyphase codes. If only binary phase codes are used, any additional delay paths available in the switched encoder and phase selector (in the decoding preprocessor) can be employed to match transmit waveforms that are at other frequency ranges. They also can be used to provide slightly different phase shifts that compensate for Doppler shifts in the return signal.

Figure 6:
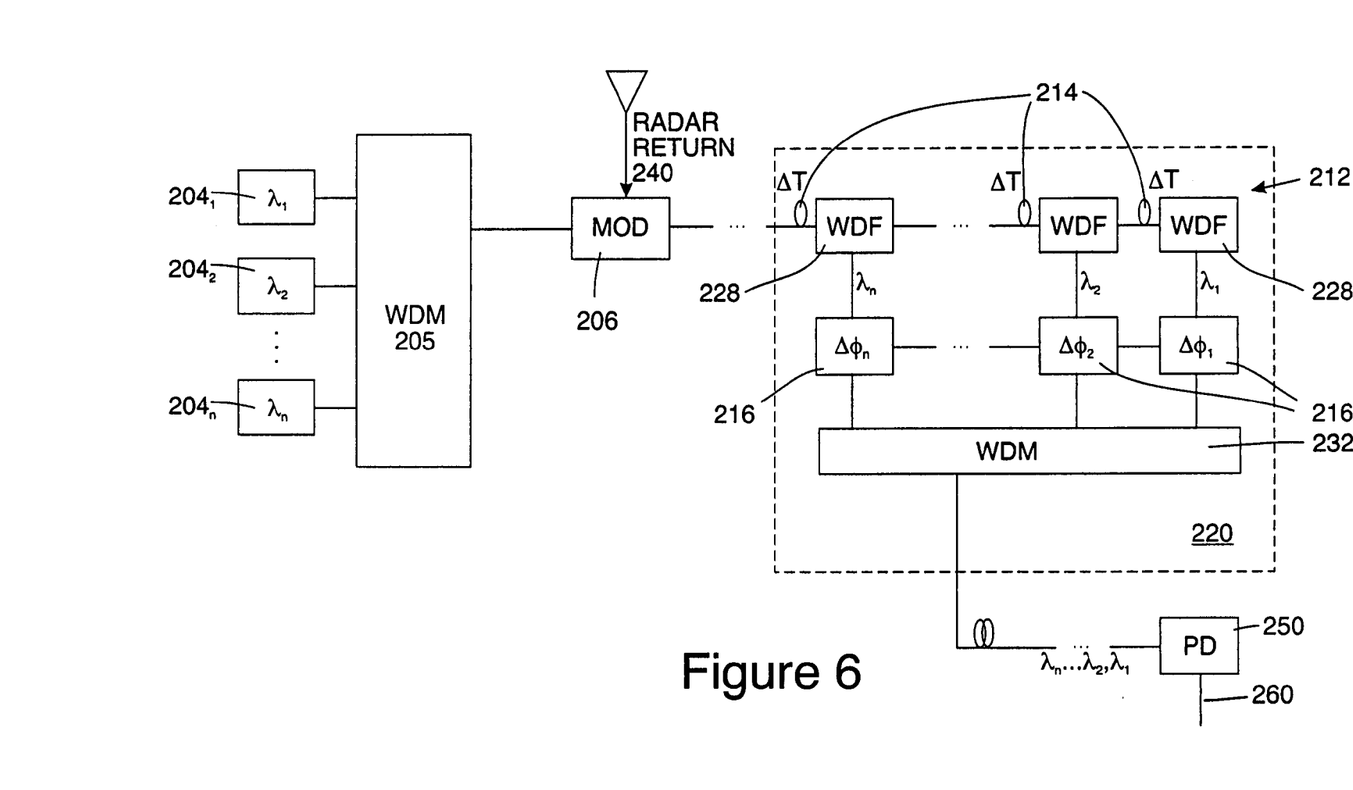
FIG. 6 illustrates an embodiment of a decoding preprocessor that provides a tapped delay line without suffering from significant attenuation.

In general, a tapped delay line suffers from attenuation of the signal, because that signal power is divided among the multiple taps and then recombined. FIG. 6 illustrates a decoding preprocessor 220 that provides a tapped delay line 212 without suffering from such attenuation. With this approach, the RF return signal is modulated onto multiple lightwave carriers, which are at different optical wavelengths $\lambda_1, \lambda_2, \ldots, \lambda_n$ generated by laser diodes $204_1$–$204_n$ and combine in a wavelength division multiplexer (WDM) 205. Each optical wavelength is associated with a given tap. Light from multiple lasers $204_1$–$204_n$ is supplied into a single optical modulator 206, to which the radar return signal 240 is applied. The preprocessor 220 makes use of various wavelength dropping filters (WDF) 228 to tap off light from the time delay waveguide 212. Wavelength $\lambda_n$ undergoes a delay of one time interval $\Delta T$. Wavelength $\lambda_{n-1}$ undergoes a delay of two time delay intervals ($2\Delta T$), and so on. Wavelength $\lambda_1$ undergoes all of the time delays. A multi-wavelength combiner (WDM) 232 located at the output end of the taps can combine these time-delayed and phase-adjusted signals without incurring the typical loss of 3 dB per 2:1 combination that is associated with conventional optical waveguide or RF waveguide power combiners. The laser wavelengths can be selected to correspond to commercial telecommunications standards so that commercially available WDF and WDM components can be used.

Figure 7:
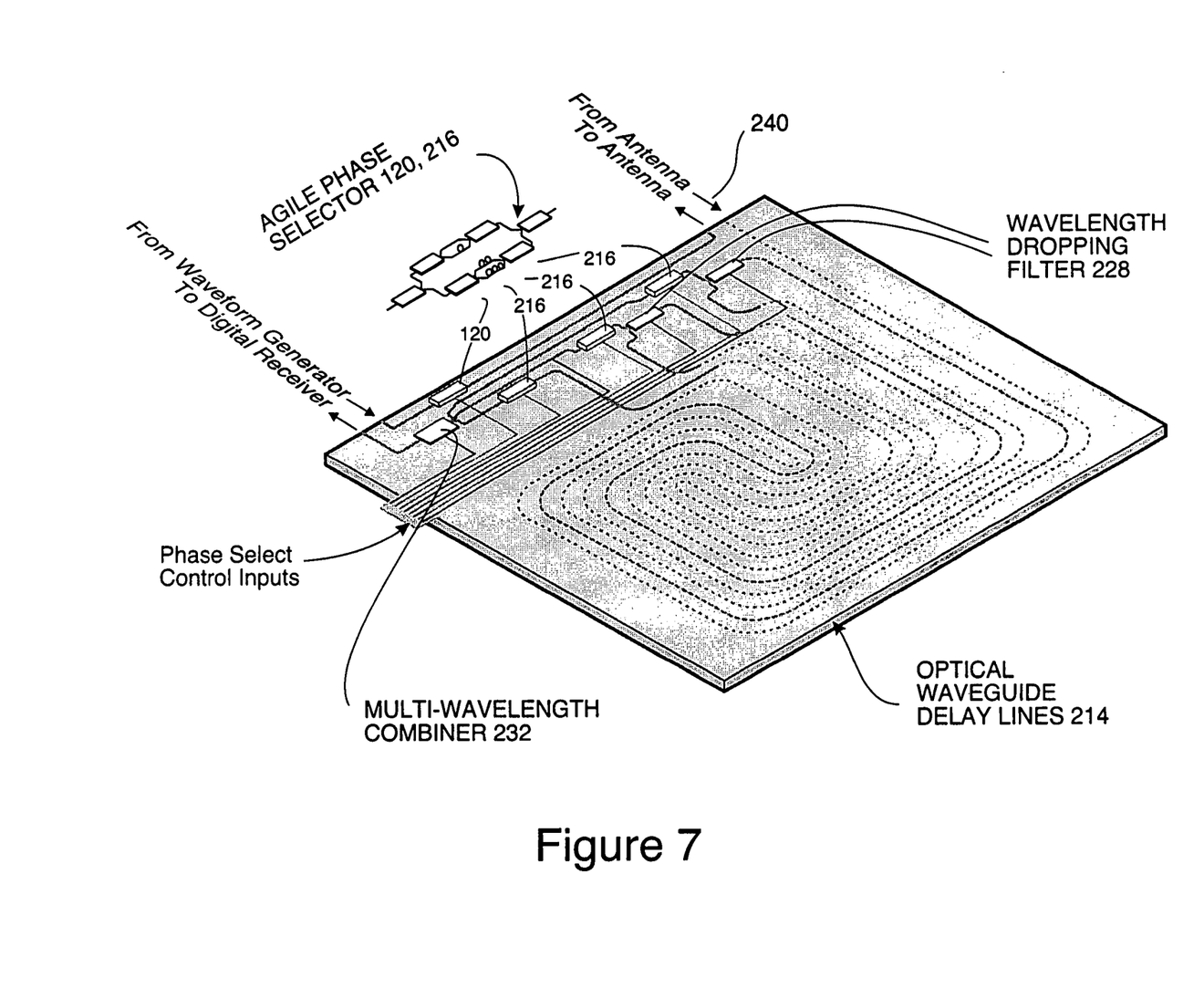
FIG. 7 depicts an integrated optic implementation of an encoder and a decoding preprocessor.

The entire decoding preprocessor as well as the encoder could be implemented on a common substrate of electro-optic material such as III–V semiconductor or lithium niobate. An embodiment of such an integrated optic implementation is illustrated in FIG. 7. Additional components that may be needed in the phase-coding system, but are not shown in FIG. 7, are the lightwave sources, optical modulators and photodetectors. These additional components need not be co-located with the integrated optic subsystem shown in FIG. 7. The integrated optical implementation illustrated by FIG. 7 is most suitable for short compressed pulses and phase codes having a relatively short length (at its first level). As an example, a 0.5 nsec compressed pulse interval corresponds to a lithium niobate waveguide length of 6.8 cm. The length of the phase code (first level) determines the maximum delay line length. For a length seven code at this compressed pulse interval, a maximum delay line length of 47.6 cm would be needed. Silica waveguides of such length have been fabricated on a single substrate and lithium niobate waveguides should be achievable, given the large refractive index difference of such lithium niobate waveguides. The resulting optical losses, approximately 10 dB neglecting the residual loss of the WDF 228 and WDM 232 and the phase selector 116, may still be acceptable for many radar applications. If lower losses are desired, optical fiber segments might be used instead for the delay lines between the taps.

Various phase codes could be used with the disclosed system. The disclosed technology is not restricted to having only particular phase codes. Generally, a larger preprocessor with more taps is needed for longer codes. A combined approach is disclosed herein for processing long phase codes that comprise concatenations of shorter-length codes. This combined approach processes smaller portions of the code (i.e., the shorter-length codes) in the RF-lightwave domain and completes that processing (i.e., of the concatenated combination) in the digital-electronic domain.

The encoder and the decoding preprocessor can be implemented as photonic guided-wave structures. Such structures can be fabricated using conventional photonic-device processing techniques.

Having described this technology in connection with preferred embodiments thereof, modification will now suggest itself to those skilled in the art. As such, the technology is not to be limited to the disclosed embodiments, except as specifically required by the appended claims.

What is claimed is:

1. A radar pulse compression system having an encoder and a decoder, said encoder including a plurality of optical delay lines and switches responsive to a phase control code for selecting a particular sequence of delays, said decoder counteracting the delays imposed by the encoder by applying counteracting delays to a received signal, the decoder including an optical tapped delay line having a plurality of taps and further including a plurality of additional optical delays lines coupled to said taps, the plurality of additional optical delay lines imposing said counteracting delays which counteract the delays imposed by the encoder.

2. The radar pulse compression system of claim 1 wherein the phase control code is a multi-bit, m-state code that defines a pattern having m possible delay states for each bit.

3. The radar pulse compression system of claim 2 wherein the phase control code is a multi-bit two state code that defines a binary sequence of delays.

4. The radar pulse compression system of claim 1 wherein the encoder applies delay to a wideband or multiple frequency RF waveform.

5. The radar pulse compression system of claim 4 wherein the decoder applies the counteracting delays to the received signal to thereby decode the received signal.

6. The radar pulse compression system of claim 1 wherein the phase control code corresponds to a sequence of delays which can be organized into delay subsets in which the delays of each subset follow an identical sequence and wherein a delay set comprising all of the delay subsets corresponds to a further sequence of delays which are applied subset by subset.

7. The radar pulse compression system of claim 6 wherein the decoder includes a lightwave preprocessor and an electronic processor, wherein the lightwave preprocessor is effective to decode received signals according to said identical sequence at a delay subset level of decoding and wherein the electronic processor is effective to decode received signals according to said further sequence of delays at a delay set level of decoding.

8. The radar pulse compression system of claim 1 wherein the input signal comprises a plurality of frequency components, each frequency component having a different phase shift imposed by the encoder.

9. The radar pulse compression system of claim 7 wherein the further sequence of delays follows a sequence having a bit length N and wherein, after each N delays at the delay set level said identical sequence is modified.

10. The radar pulse compression system of claim 8 wherein the optical tapped delay line has delay elements between successive taps thereof, the delays between successive taps corresponding to said N delays.

11. The radar pulse compression system of claim 1 wherein loss/gain elements are associated with the taps of the optical tapped delay line for adjusting the range sensitivity of said radar pulse compression system.

12. The radar pulse compression system of claim 1 wherein the plurality of switches is reconfigured at each phase code interval to select a temporal sequence of delay paths.

13. The radar pulse compression system of claim 1 wherein the encoder receives a RF signal and includes at least one set of phase-selector switches and at least two optical delay paths, said switches determining which of said at least two optical delay paths carry the RF signal to an output of said encoder.

14. The radar pulse compression system of claim 1 wherein the encoder includes a plurality of optical tapped delay lines each having a plurality of taps, the additional optical delay lines being coupled at outputs thereof from each tap for imposing a phase delay to the signal at each tap in accordance with the phase control code, the additional optical delay lines having outputs which are summed together at one or more summing junctions, the summing junctions being functionally coupled to still further additional delay lines having outputs that are summed together as still further one or more junctions, the combination of additional optical delay lines and still further additional optical delay lines imposing counteracting delays for a multilayer phase control code.

15. The radar pulse compression system of claim 1 wherein plurality of optical delay lines are provided by a plurality of optical fibers or a plurality of optical waveguides.

16. The radar pulse compression system of claim 1 wherein the decoder includes an optical modulator for modulating a lightwave carrier with the received signal, a lightwave phase decoder for phase decoding an output of the optical modulator, and a photodetector for converting the output of the lightwave phase decoder to radio frequency as a decoded receiver waveform.

17. The radar pulse compression system of claim 16 wherein the lightwave carrier has multiple wavelengths.

18. The radar pulse compression system of claim 17 wherein the lightwave phase decoder includes said optical tapped delay line having said plurality of taps, and wherein said additional optical delay lines having outputs that are summed together to produce a summed optical output, said summed optical output being coupled to said photodetector for converting the output of the lightwave phase decoder to radio frequency as a decoded receiver waveform.

19. The radar pulse compression system of claim 18 wherein said plurality of taps comprises a plurality of wavelength dropping filters, each wavelength dropping filter selecting light modulated onto a different wavelength selected from said multiple wavelengths of the lightwave carrier.

20. The radar pulse compression system of claim 18 wherein said summed optical output is produced by a multi-wavelength combiner coupled to said additional optical delay lines.

21. The radar pulse compression system of claim 1 wherein the encoder and decoder are each disposed on a monolithic substrate.

22. The radar pulse compression system of claim 1 wherein the encoder and decoder are both disposed on a common monolithic substrate.

23. The radar pulse compression system of claim 22 wherein said plurality of optical delay lines, said optical tapped delay line and said plurality of additional optical delay lines are provided by optical waveguide structures fabricated on said common monolithic substrate.

24. A phase decoder for a radar receiver comprising:
   (a) an optical modulator for modulating a lightwave carrier with a radio frequency radar return waveform from the receiver;
   (b) a lightwave phase decoder for phase decoding the output of the optical modulator, the phase decoder including phase selector switches for switching in and out delay lines of different delays in response to a phase select control code; and
   (c) a photodetector for converting the output of the lightwave phase decoder to radio frequency as a decoded receiver waveform.

25. The phase decoder for a radar receiver of claim 24 wherein the phase control code is a multi-bit, m-state code that defines a pattern having m possible delay states for each bit.

26. The phase decoder for a radar receiver of claim 24 wherein the phase control code is a multi-bit two state code that defines a binary sequence of delays.

27. The phase decoder for a radar receiver of claim 24 wherein the lightwave decoder includes an optical tapped delay line having a plurality of taps, the phase selector switches being coupled at outputs thereof from each tap for imposing a phase delay to the signal at each tap in accordance with the phase control code, the phase selector switches having outputs which are summed together.

28. The phase decoder for a radar receiver of claim 24 wherein the lightwave decoder functionally includes a plurality of tapped delay lines each having a plurality of taps, the phase selector switches being coupled at outputs thereof from each tap for imposing a phase delay to the signal at each tap in accordance with the phase control code, the phase selector switches having outputs which are summed together at summing junctions, the summing junctions being functionally coupled to still further phase selector switches which are coupled at outputs thereof to each summing junction for imposing a phase delay to the signal at each summing junction in accordance with the phase control code, the still further phase selector switches having outputs which are functionally summed together at another summing node.

29. A method of generating and processing RF radar transmit and return waveforms comprising:
   (a) modulating RF radar transmit and return waveforms onto lightwave carriers;
   (b) photonically encoding the lightwave carrier associated with the radar transmit waveform and photonically decoding the lightwave carrier associated with the radar return waveform using a decoding preprocessor to partially decode the radar return signal; and
   (c) photodetecting the encoded lightwave carrier associated with the radar transmit waveform and the lightwave carrier associated with the radar return waveform.

30. The method of claim 29 further including applying electronic pulse compression techniques to the photodetected lightwave carrier associated with the radar return waveform.

31. The method of claim 30 wherein the encoding step includes switching in and out optical delay-lines to produce desired RF phase shifts in the waveform to be transmitted.

32. The method of claim 31 wherein the decoding step includes obtaining appropriately delayed copies of the return waveform to be decompressed and applying RF phase shifts to those copies, the RF phase shifts applied to said copies having associated phase shifts from the encoding step, the total delay for each associated encoding and decoding phase shift being a fixed total delay.

33. The method of claim 30 wherein the decoding preprocessor creates clock and data waveforms that are supplied to an electronic processor, said electronic processor applying electronic pulse compression techniques to the photodetected lightwave carrier associated with the radar return waveform.

34. The method of claim 33 wherein a multi-layer phase code is used to photonically encode said lightwave carrier associated with the radar transmit waveform.

35. The method of claim 34 wherein said multi-layer phase code has a first layer and at least one additional layer, said decoding preprocessor decoding said first layer and said electronic processor decoding said at least one additional layer of said multi-layer phase code.

* * * * *